June 20, 1967 W. R. GARRETT ETAL 3,326,305
DRILL BIT CONTROL APPARATUS
Filed Sept. 10, 1964 10 Sheets-Sheet 1
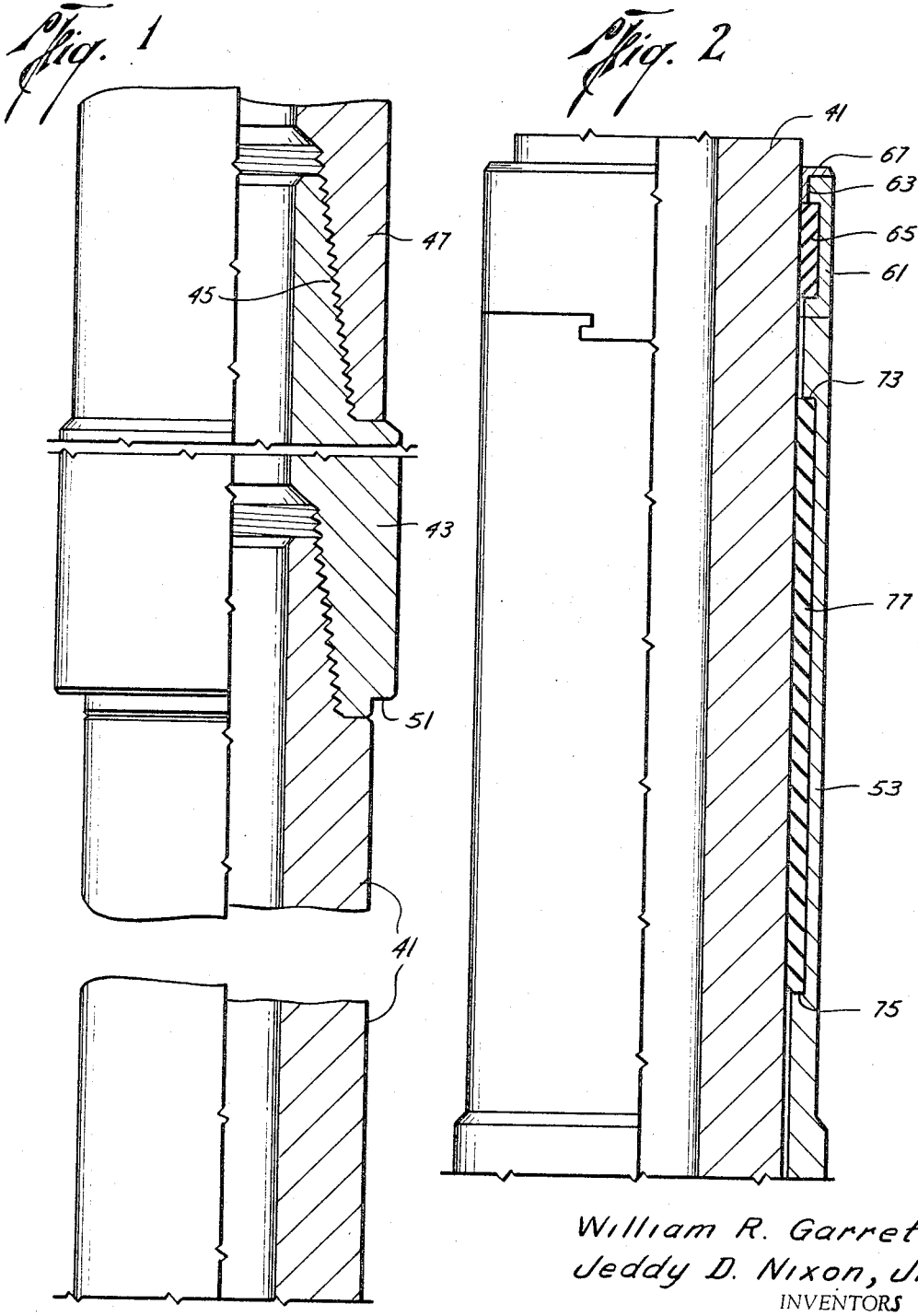
William R. Garrett
Jeddy D. Nixon, Jr.
INVENTORS
BY Murray Robinson
ATTORNEY

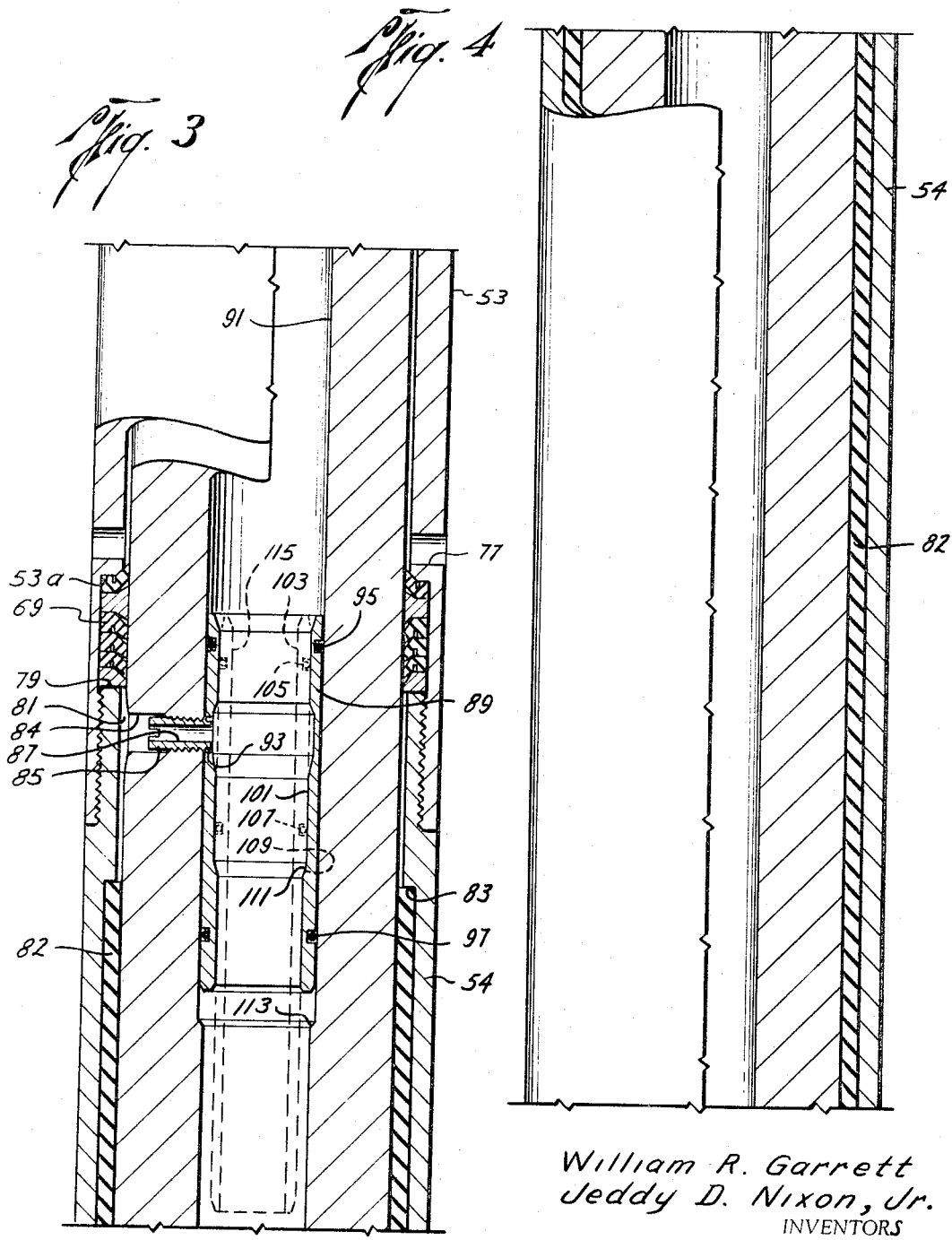

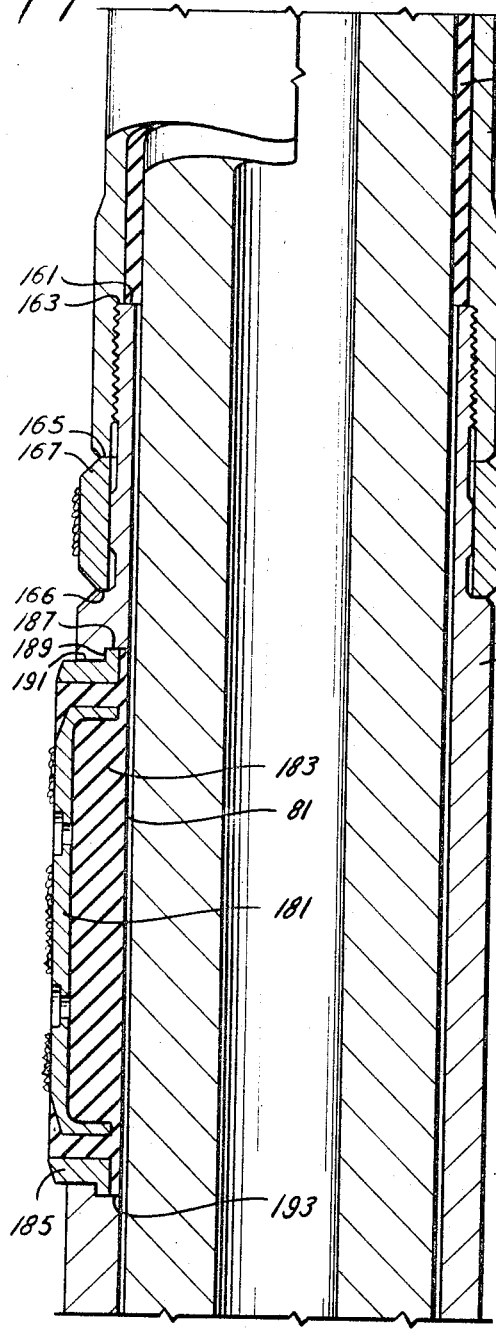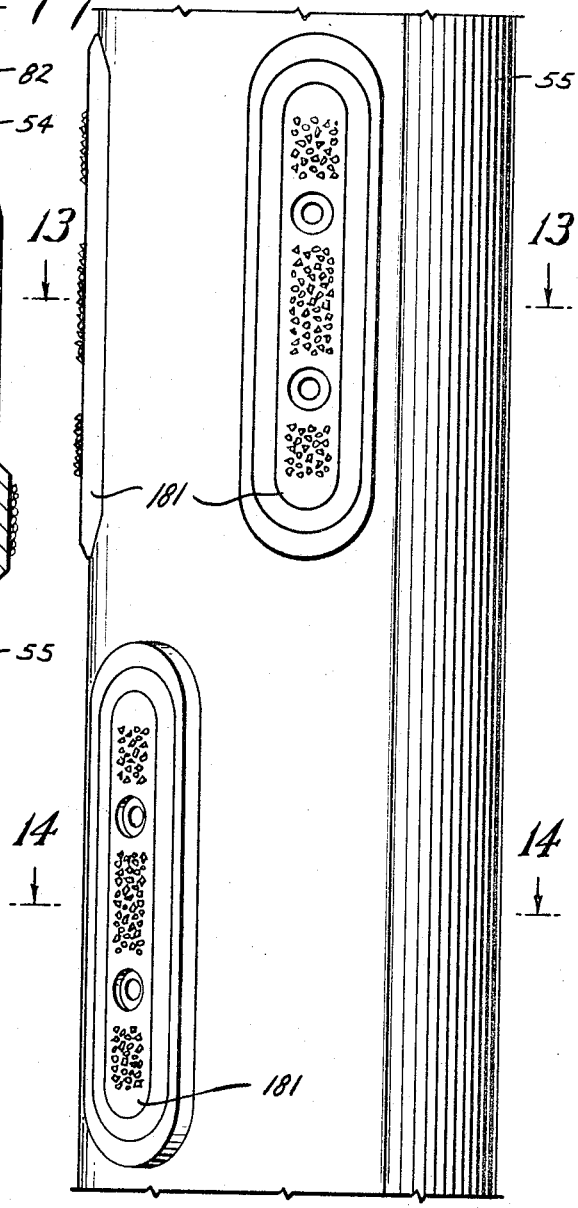

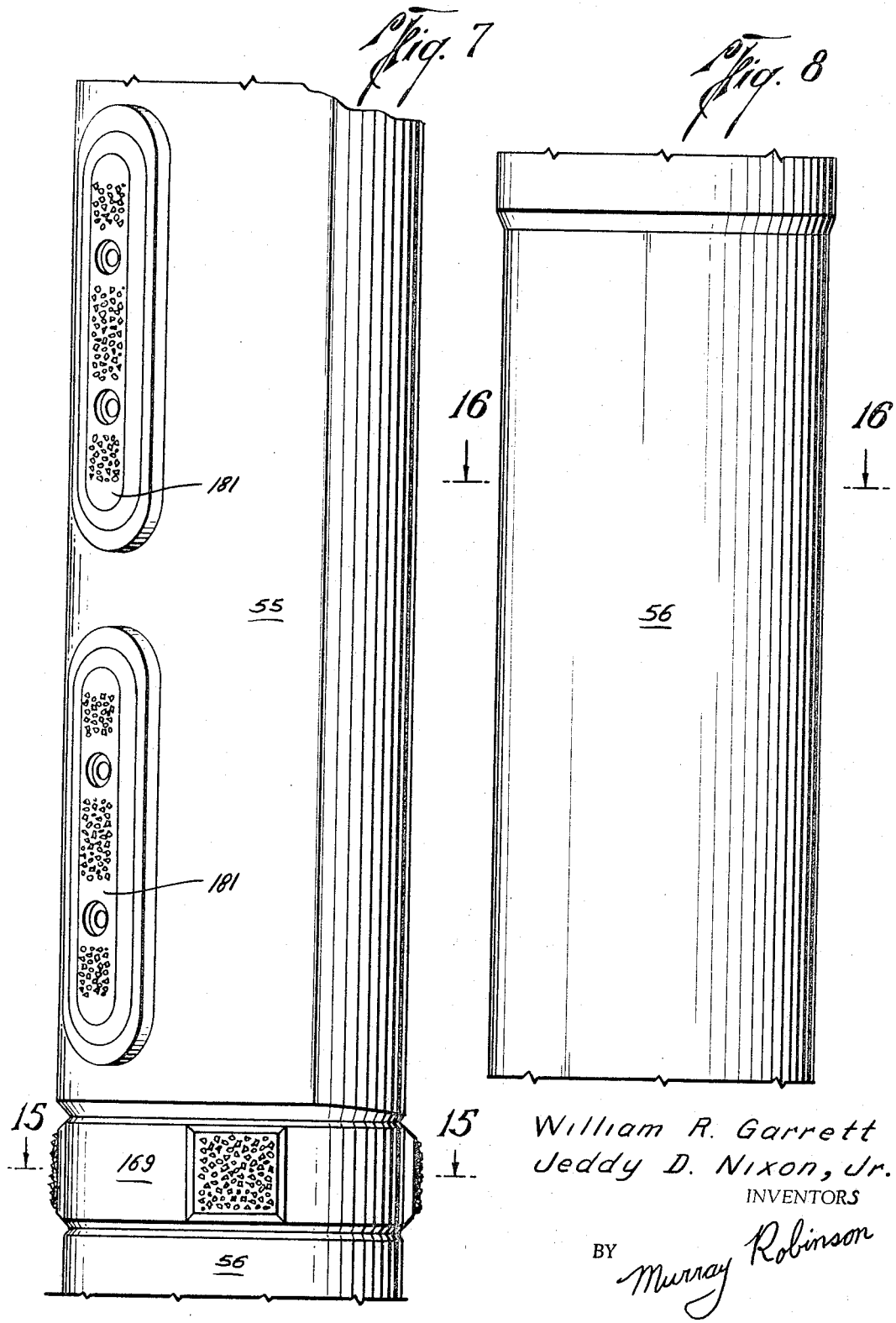

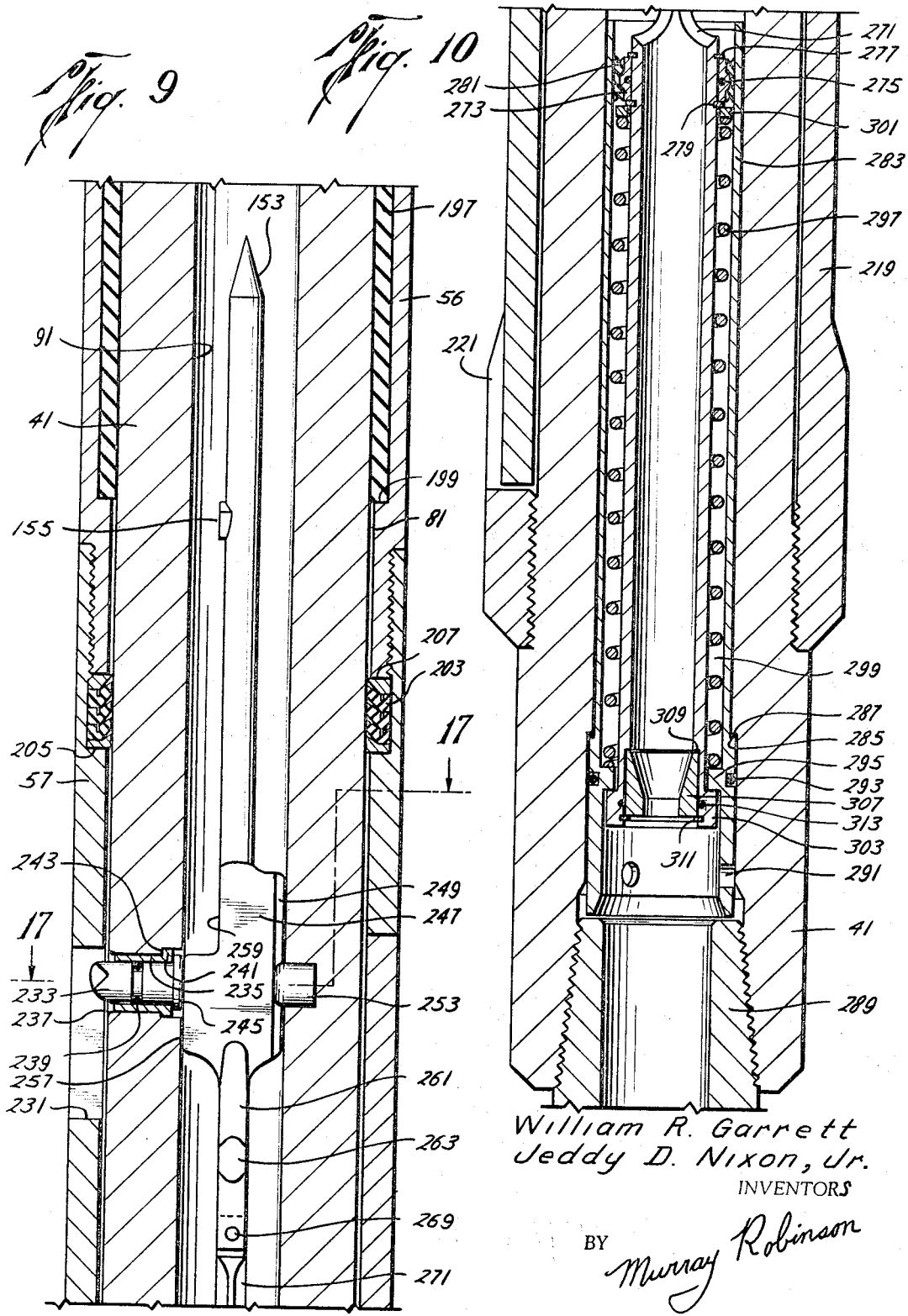

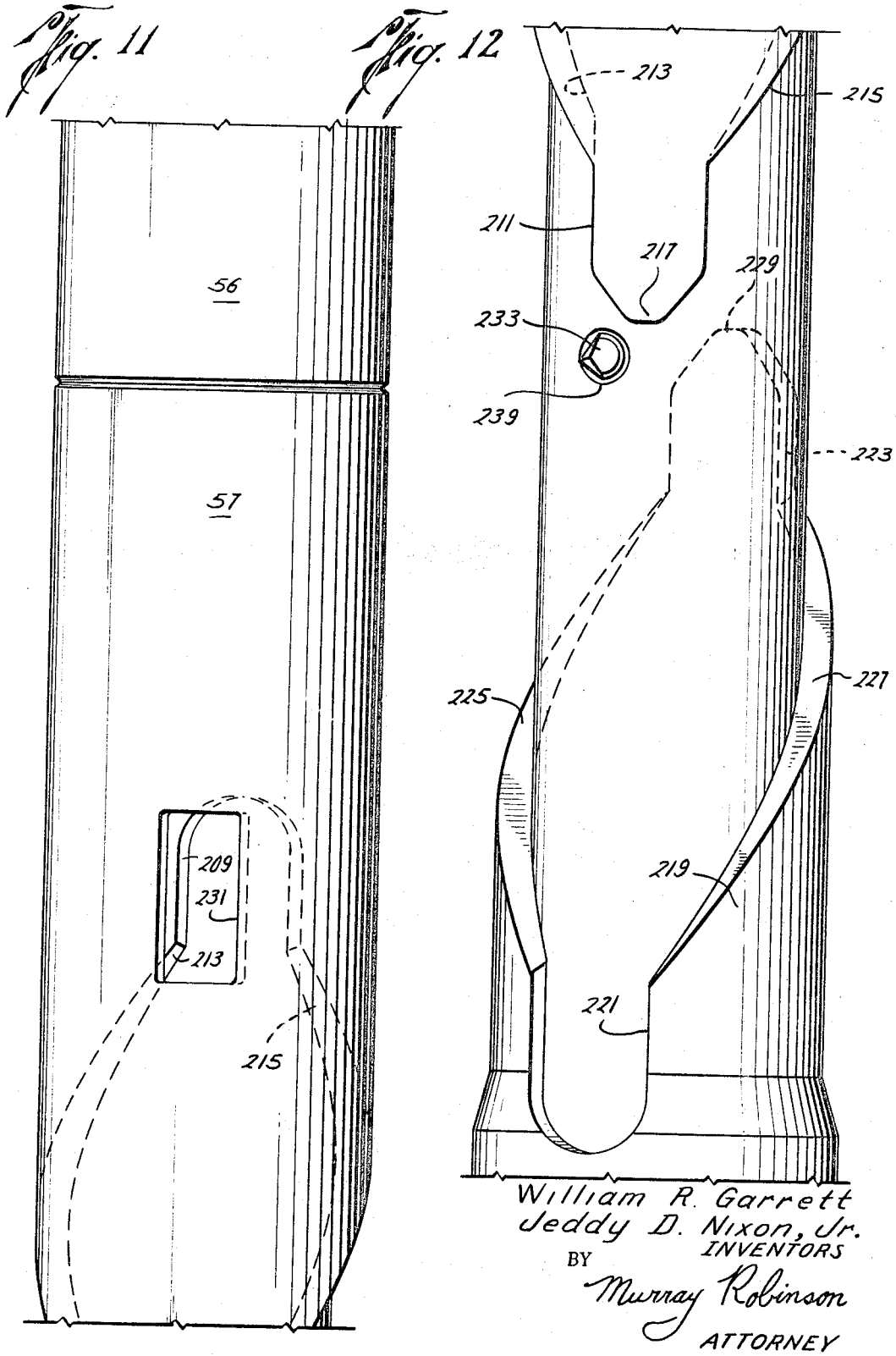

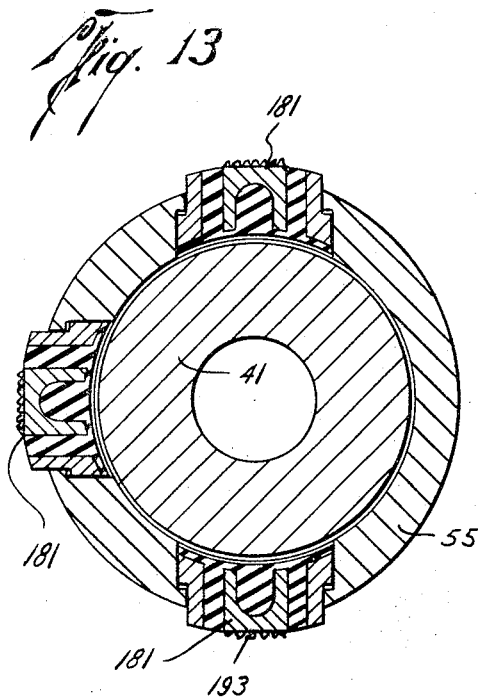
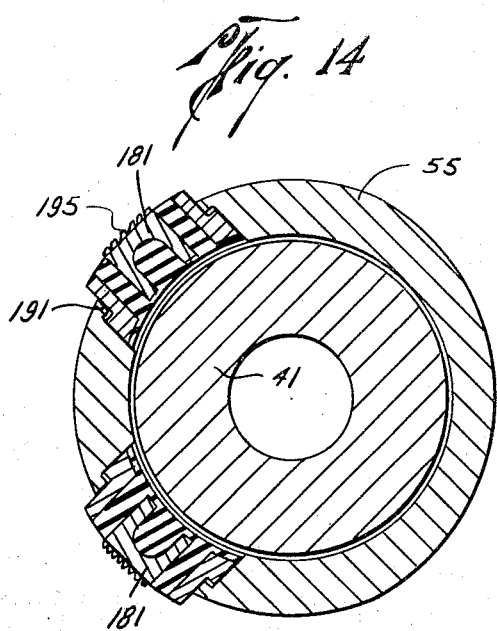
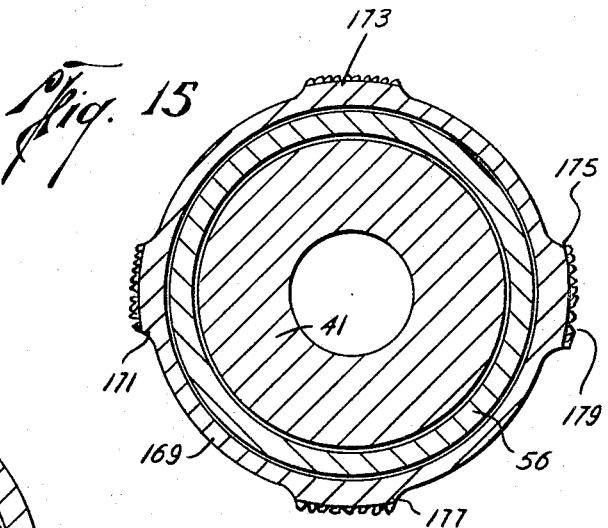
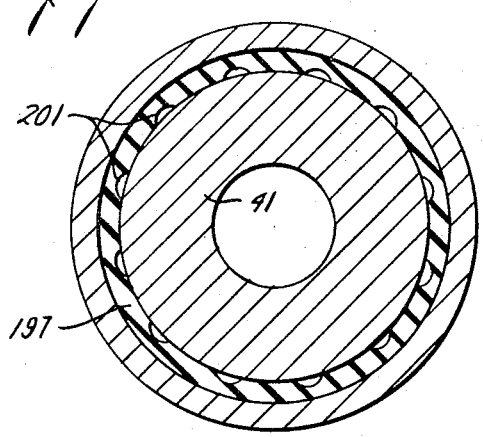

June 20, 1967 W. R. GARRETT ETAL 3,326,305
DRILL BIT CONTROL APPARATUS
Filed Sept. 10, 1964 10 Sheets-Sheet 8
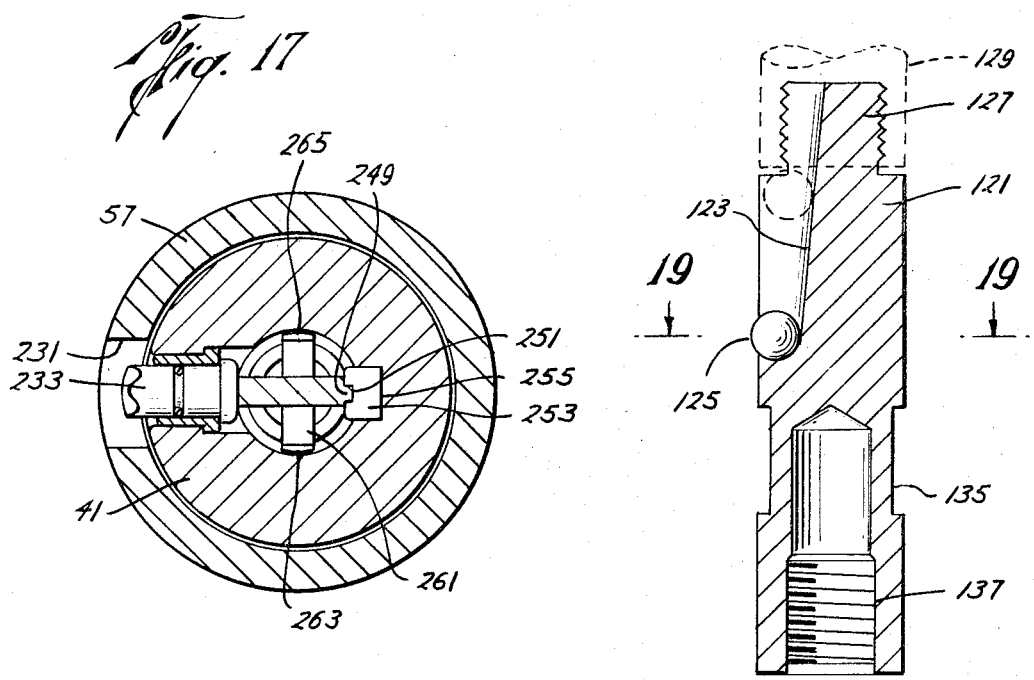
William R. Garrett
Jeddy D. Nixon, Jr.
INVENTORS
BY Murray Robinson
ATTORNEY

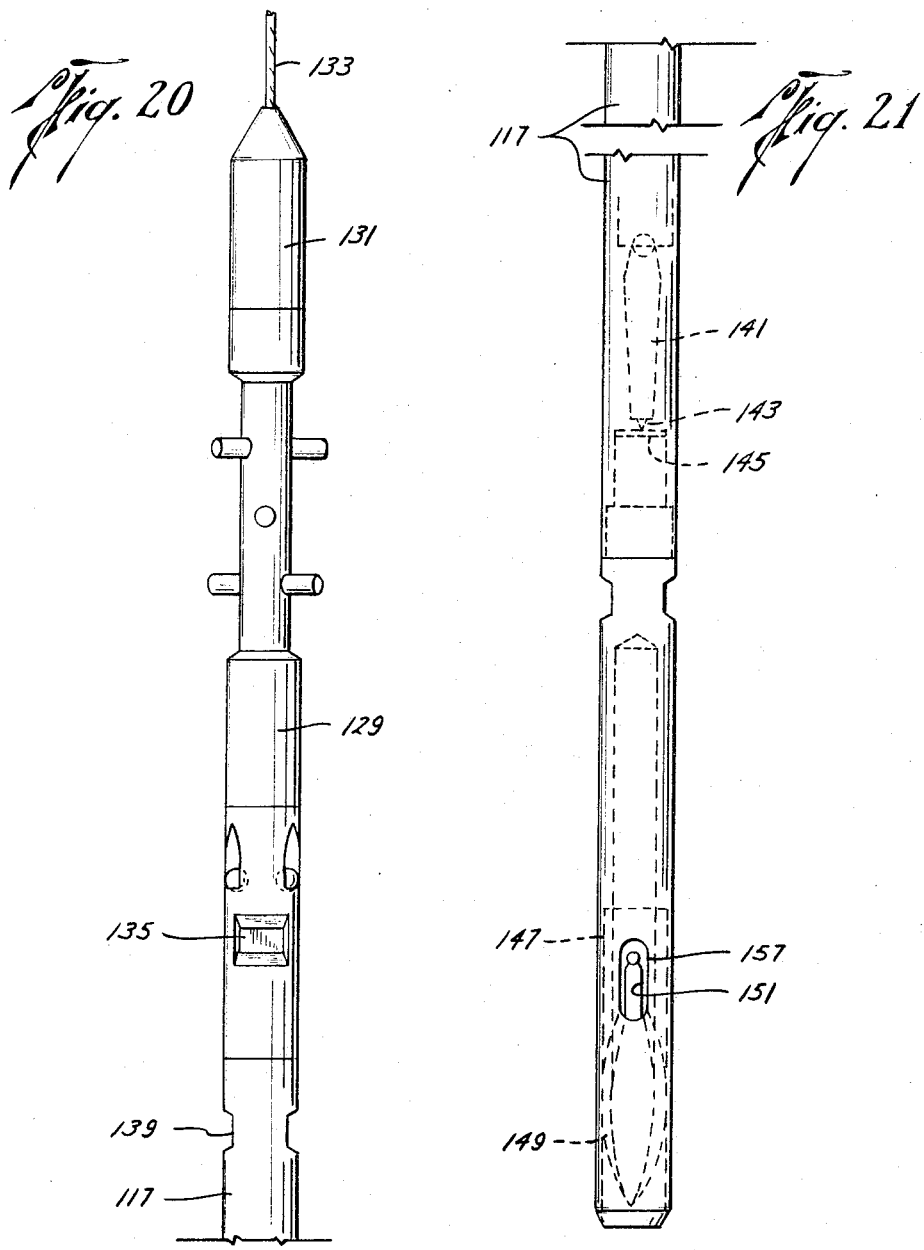

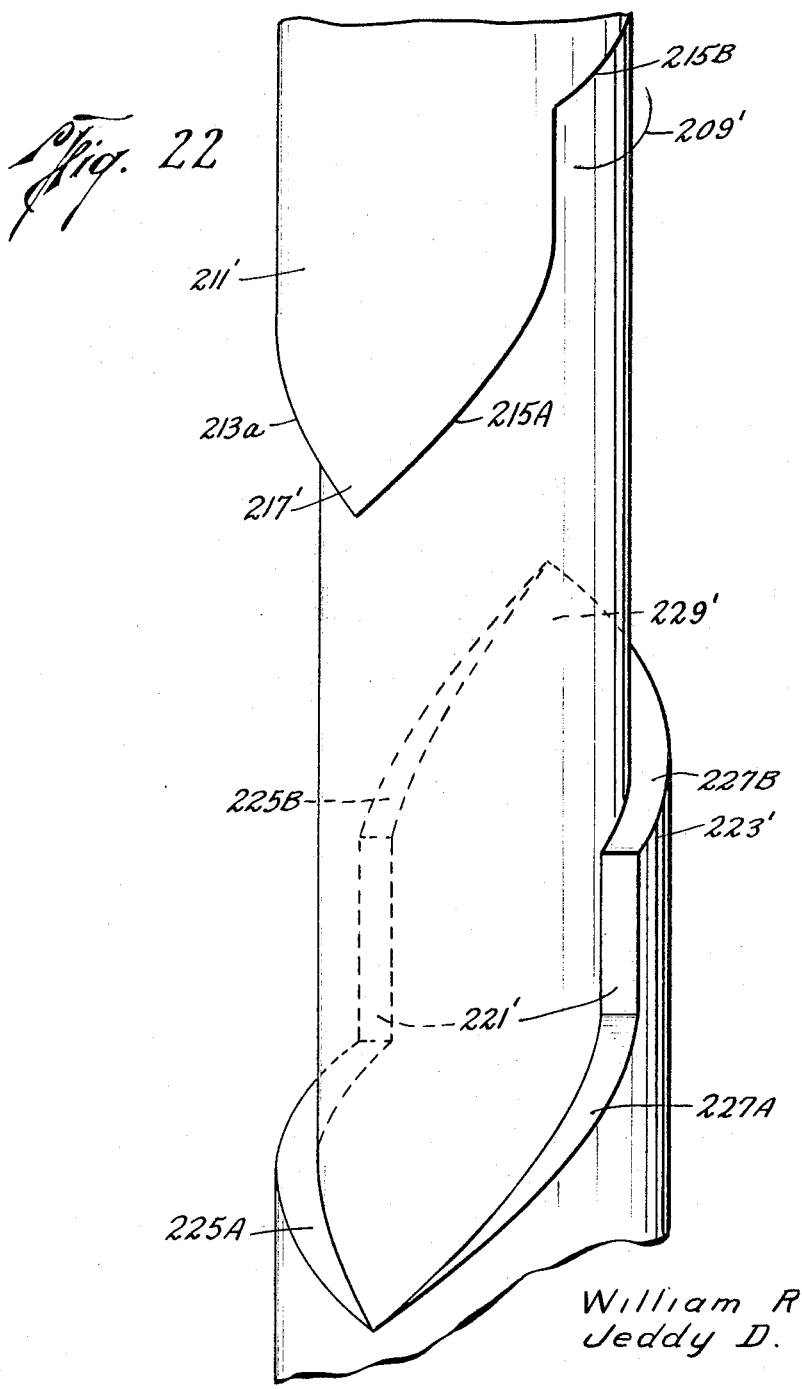

United States Patent Office 3,326,305
Patented June 20, 1967

3,326,305
DRILL BIT CONTROL APPARATUS
William R. Garrett and Jeddy D. Nixon, Jr., Midland, Tex., assignors to Drilco Oil Tools, Inc., Midland, Tex., a corporation of Texas
Filed Sept. 10, 1964, Ser. No. 395,623
16 Claims. (Cl. 175—81)

This present invention pertains to drill bit control apparatus and is an improvement on the bit guiding and loading means of the general type disclosed in U.S. patent application Ser. No. 720,284, filed 1958, entitled "Well Bore Apparatus" (now abandoned), and a continuation thereof, Ser. No. 318,747, filed Oct. 24, 1963, by William S. Bachman, Stanley C. Moore, Henry M. Rollins, and William R. Garrett, now Patent No. 3,298,449, granted Jan. 17, 1967, said applications having been assigned to the same assignee as the present invention.

As disclosed in said prior applications such drill bit driving and loading means includes a barrel adapted to be anchored in an earth bore in a selected position and a tubular mandrel reciprocable and rotatable in the barrel and carrying the bit at its lower end and adapted to be connected to a drill string at its upper end. A port in the mandrel admits drill stem fluid to the annulus formed between barrel and mandrel to extend resiliently mounted anchor shoes from the barrel to engage the bore wall. Seals between the barrel and mandrel at the upper and lower ends of the mandrel prevent the escape of fluid from the annulus. Bearing means between the barrel and mandrel provide for the transmission of lateral forces between mandrel and barrel as dictated by the azimuthal positions of the anchor shoes, thereby to guide the drill bit either straight ahead or to one side of the bore and either straight down or at an inclination. Piston means may be added to the mandrel to travel in the barrel and push axially on the mandrel, thereby to load the bit and force it against the end of the bore. Since the apparatus may be used to impose either axial or lateral forces on the bit, or both, it may be called a bit control apparatus.

In the use of such bit control apparatus it is necessary periodically to reposition the barrel axially in the earth bore, for the travel of the mandrel relative to the barrel is limited to the distance the mandrel can travel while the port therein remains between the seals at the upper and lower ends of the barrel. It is also necessary to be able to position the barrel azimuthally in the well bore if the control device is to be used to deviate the bore from straight ahead. To reposition the barrel it is temporarily connected to the mandrel. The present invention relates primarily to improved method and means for temporarily connecting the barrel to the mandrel and positioning the barrel axially and azimuthally as desired.

According to the present invention a hydraulically controlled spring detent means is provided to temporarily connect the barrel to the mandrel to prevent axial motion of one relative to the other. Whenever there is fluid pressure in the mandrel to extend the barrel anchor shoes, the detent is releasable to permit relative motion of mandrel and barrel. With fluid pressure reduced and the latch means engaged, the barrel can be moved axially with the mandrel.

Further, in accordance with the invention, cooperating cam means are provided on the barrel and mandrel to rotate the mandrel into a single predetermined azimuthal position relative to the barrel upon axial movement of the mandrel relative to the barrel in the cam engaging direction. The cam means are so positioned relative to the detent means that the latter is in engaged position when the cam means are fully engaged. So long as the detent means is engaged, the cam means prevents relative rotation of the barrel and mandrel.

Together the detent means and cam means provide latch means to prevent both axial and rotational motion of the barrel and mandrel relative to each other and for holding them in a single predetermined relative position both axially and azimuthally.

Further, in accordance with the invention, there is provided sleeve valve means [1] for blocking the port to the annulus while the earth bore is flushed with fluid from the drill string preparatory to drilling, pin means carried by the latch means to engage cam means on a survey instrument lowered through the valve means, thereby to orient the survey instrument relative to the mandrel, and a ball type spear mounted above the survey instrument and arranged to pass through the sleeve valve means with the survey instrument when it is lowered into the bit control apparatus and to open the sleeve valve means when the survey instrument is raised out of the bit control apparatus.

By means of the foregoing apparatus elements of the invention, a speedy method of operation of the bit control device becomes possible involving primarily reciprocation of the drill string and variation of the drill string fluid pressure with little or no need to rotate the drill bit when repositioning the barrel between regular drilling operations.

For a more detailed description of a preferred embodiment of the invention reference will now be made to the accompanying drawings wherein:

FIGURES 1–10 together constitute a side elevation, partly in section, showing a bit control apparatus embodying the invention, with the latch means engaged;

FIGURES 11 and 12 are elevations of the portion of the bit control apparatus shown in FIGURES 1–7 that incorporates the latch means, showing mandrel and barrel in the position occupied with the latch means disengaged;

FIGURES 13–17 are transverse sections taken at the planes indicated at 13—13, 14—14, 15—15, 16—16 and 17—17, respectively, of FIGURES 1–10;

FIGURES 18 and 19 are respectively a vertical section and transverse section of a valve closure removal tool; and FIGURES 20 and 21 are together an elevation of a string of wire line tools including an alignment sub, survey instrument, and the aforementioned valve closure removal tool, connected to a fishing neck and rope socket, and FIGURE 22 is an elevation similar to FIGURE 12 showing a latch means incorporating a modified form of clutch means.

The foregoing drawings are to scale, being forty percent of full size.

Referring now to FIGURES 1–10, there is shown a bit control apparatus including a tubular mandrel 41 connected at its upper end with a tubular sub 43. The upper end of the sub is provided with thread means 45 for connecting the bit control apparatus to the lower end of a drill string 47, the lowest member of which is preferably a stabilizer, for example one such as is shown in U.S. Patent No. 3,063,759 issued Nov. 13, 1962 on the application of S. C. Moore, et al.

The sub 43 at its lower end provides a shoulder 51 serving as stop means to limit the upward travel of the barrel (described infra) relative to the mandrel.

Rotatably and axially reciprocable on the mandrel is a barrel comprising a plurality of sections 53, 54, 55, 56, 57, connected together by screw threads. Dovetailed to the upper end of the uppermost section is a detritus seal 61 including a metal ferrule 63 making a close fit around the mandrel and an internally longitudinally fluted rub-

---

[1] The sleeve valve means is especially useful when a float valve is run at the bottom of the drill string.

ber centralizing bushing 65 preventing metal to metal contact between thimble 63 and mandrel 41. The upper end 67 of thimble 63 provides stop means cooperable with shoulder stop means 51 to limit upward travel of the barrel relative to the mandrel 41.

Barrel section 53 forms a spacer sleeve between stop means 67 and the annular seal means 69 carried in the lower end of barrel section 53. This prevents the seal means from riding up the mandrel to the uppermost part thereof. The uppermost part of the mandrel is apt to become rough in use due to engagement therewith of pipe tongs, and such roughness can damage the seal means 69. An internally fluted rubber sleeve 71 is disposed inside barrel section 53 between internal shoulders 73, 75. Rubber sleeve 71 forms a bearing between mandrel 41 and barrel section 53. Just above seal means 69 there are a plurality of drain ports 77 to allow the barrel section 53 to be flushed.

Annular seal means 69 seals between the barrel and mandrel 41. The seal means 69 is retained between shoulder 53a at the upper end of a threaded counterbore in the bottom of barrel section 53 and the upper end 79 of a threaded pin on the upper end of barrel section 54. Seal means 69 defines the upper end of a pressurable annulus 81 between the barrel and mandrel. Below seal means 69 there is a long, internally fluted, rubber sleeve 82 forming a bearing means between the barrel and mandrel. The upper end of sleeve 82 bears against shoulder 83 in barrel section 54.

A threaded passage 84 extends radially through the wall of tubular mandrel 41. A screw plug 85 having an orifice 87 therethrough is screwed into passage 84. The walls forming orifice 87 are hard. A hard, corrosion resistant, bushing 89 is disposed in the flow passage 91 in mandrel 41. Bushing 89 has a port 93 in register with passage 84 receiving the end of plug 85, thereby retaining the bushing in posiition. O-rings 95, 97 seal between the bushing 89 and flow passage 91. When the barrel is at the lower limit of its travel relative to mandrel 41, as shown, passage 84 is in communication with annulus 81 at the upper end thereof just below seal means 69.

The bushing 89 has an internal passage 101 that is held to close tolerances forming a valve seat. Forming such a seal directly on the inner surface forming flow passage 91 through the mandrel would be difficult. When it is desired to shut off flow passage 91 from annulus 81, a tubular valve closure 103 may be dropped down the drill string. Closure 103 carries O-ring seals 105, 107 to engage the seat 101 provided by bushing 89 above and below orifice 87. Annular shoulder 109 on the closure rests on annular shoulder 111 on the bushing, these shoulders providing means to limit downward travel of the closure. A shoulder 113 limits downward travel of the bushing in the mandrel should it come loose from plug 85.

It is to be noted that the closure 103 has an unrestricted passage 115 therethrough. This makes it possible to lower a surveying instrument 117 through it into the bottom of the bit control apparatus adjacent the drill bit. When it is desired to remove the valve closure, a removal tool 119 can be used. To eliminate the need for an extra trip into the drill string, the removal tool 119 can be run above the survey instrument as shown in FIGURE 20. When surveying is not desired, the removal tool can be run separately.

Details of the valve closure removal tool are shown in FIGURES 18 and 19. The tool comprises a solid generally cylindrical body 121 having a plurality of upwardly, inwardly inclined cylindrical grooves 123 formed at the top thereof. In each groove 123 is disposed a ball 125 which protrudes beyond the perimeter of body 121 when at the bottom of groove 123, as shown in full lines in FIGURE 18, but which is fully within the perimeter of body 121 when at the upper end thereof, as shown in dotted lines in FIGURE 18.

The upper end of body 121 is provided with a threaded pin 127 adapted to screw into the lower end of a wire line fishing sub 129 shown in dotted lines in FIGURE 18. As shown in FIGURE 20, the upper end of fishing sub 129 is screwed into a rope socket 131 for receiving the lower end of wire line 133.

The middle part of body 121 is provided with two wrench receiving flats at 135. At the lower end of body 121 there is a threaded socket 137 which screws on to the top of survey instrument 117. The latter is also provided with two wrench receiving flats 139.

Referring to FIGURE 21, the surveying instrument 117 may be of any known conventional type; for example it may be a pendulum type photographic instrument manufactured by Sperry-Sun. Such an instrument includes a pendulum 141 which positions a pointer 143 over the surface of a disc of electrosensitive paper. While the instrument is being lowered in the drill string, the movement of the pendulum prevents it from recording but whenever the instrument is still for about one minute, the paper records the position of the pointer, thus indicating the azimuthal position of the low side of the instrument and the extent of its deviation from vertical. Further details of such surveying instruments are available in published literature and need not be repeated here. If desired, a magnetic survey instrument may be run to obtain the compass direction of the low side of the hole.

In order to position the surveying instrument in a known azimuthal relationship to the mandrel, the aligning collar 145 is screwed to the lower end of the surveying instrument. Inside the collar 145 is disposed a tube 147 whose lower end is cut off at an angle forming a pair of cam surfaces 149 leading to a vertical slot 151. When the alignment collar reaches the bottom of the bit control device it passes over an upstanding pin 153 (see FIGURE 9) and an alignment lug 155 on the pin engages one of the cam surfaces 149 to turn the alignment collar until the lug 155 enters slot 151. To facilitate cleaning slot 151, a slot 157 is provided through the alignment collar adjacent slot 151.

Referring now to FIGURES 5–8, barrel section 55 is screwed into the lower end of barrel section 54. The upper end 161 of barrel section 55 bears against the lower end of rubber sleeve 82, but does not quite engage shoulder 163 adjacent thereto in barrel section 54. Between the lower end 165 of barrel section 54 and a shoulder 166 on barrel section 55 is disposed a back stop ring 167. When barrel section 54 is screwed tight onto barrel section 55, back stop ring 167 cannot rotate on barrel section 55, but with the sections not screwed up tight the ring can be turned to adjust its azimuthal position relative to the barrel. A similar back stop ring 169 is similarly mounted between barrel sections 55 and 56 (see FIGURE 7).

As best shown in FIGURE 15, each back stop ring includes four radially extending bosses 171, 173 175, 177, each of different radial extent. Each boss is provided with hard surfacing 179. The back stop rings are each adjusted to such an azimuthal position relative to the barrel as to dispose selected ones of the bosses directly opposite from the center of the bank of anchor shoes 181 carried by the barrel, thus limiting to the radial extent of the selected lugs how close the anchor shoes can push the barrel laterally toward the side of the earth bore.

The anchor shoes 181 are each set in and bonded to a rubber block 183 which in turn is bonded to a retention ring 185. The latter is provided with an outwardly facing annular shoulder 187 engaging an inwardly facing annular shoulder 189 in a port 191 in the barrel section 55. Lip 193 around the rubber block 183 seals with the larger diameter part of port 191. When annulus 81 is pressurized, the rubber blocks stretch and extend the shoes 181 against the wall of the earth bore. On lowering of the annulus pressure, the rubber blocks retract the shoes 181.

There are twelve anchor shoes in the barrel, arranged at five levels. There are three shoes in each of the top two levels, disposed as shown in FIGURE 13. There are two shoes in each of the lower three levels, disposed as shown in FIGURE 14. The outer surface of each shoe is coated with tungsten carbide particles 195 both for wear resistance and to prevent slippage when engaged with the earth bore. The right angular disposition of the shoes in pairs as shown in FIGURE 14 gives good lateral stability. The disposition of the shoes over a greater (180°) span as in FIGURE 13 is desirable to prevent rotation of the barrel in the earth bore. Experience with a bit control apparatus already built wherein only one level of shoes disposed as in FIGURE 13 was employed indicated that one such level was sufficient, but two levels are here shown as desirable for increased life.

To the lower end of barrel section 55 is screwed barrel section 56 which houses another internally fluted rubber sleeve 197 (see FIGURE 9) forming a lower bearing means between the barrel and mandrel. The sleeve 197 bears at its lower end against shoulder 199 in barrel section 56 and at its upper end (not shown) against the lower end of barrel section 55 where it screws into barrel section 56, the same as the upper end screws into barrel section 54. The internal fluting of the several rubber bearing sleeves is all similar to that of sleeve 197 and is shown at 201 in FIGURE 16.

To the lower end of barrel section 56 is screwed barrel section 57. Annular seal means 203 is disposed inside the upper end of barrel section 57 and is held between annular shoulder 205 in barrel section 57 and the lower end 207 of barrel section 56. Annular seal means 203 seals between the barrel and mandrel 41 and defines the lower end of pressurable annulus 81.

Referring now also to FIGURES 11 and 12, the lower end of barrel section 57 is cut to form a vertical slot 209, and tongue 211, both of which have vertical side walls, with cams formed by inclined surfaces 213, 215 connecting the side walls of the slot with the side walls of the tongue. The end of the tongue is bevelled to a dull point 217.

Screwed to the lower end of mandrel 41 is a collar 219. The upper end of collar 219 is cut correlative to the lower end of barrel section 57, there being a slot 221 and a tongue 223, each having vertical side walls, the side walls being joined by inclined surfaces 225, 227 forming cams. The end of tongue 223 is bevelled to a dull point 229.

Referring now to FIGURE 22, there is shown a modification in which tongues 211′, 223′, and slots 209′, 221′ are all of 180 degrees circumferential extent. This results in the vertical side walls of the tongues 211′, 223′ being in the same plane as the vertical side walls of the sockets 209′ respectively, with no room therebetween for cam surfaces. Instead, the sides of the tongues and slots are formed as cam surfaces 213A, 213B (not shown); 215A, 215B; 225A, 225B; 227A, 227B, the cam surfaces on the tongues joining at the tongue points 217′, 229′. This construction provides tongues of greater strength than that shown in FIGURES 11, 12, and the FIGURE 22 construction is easier to machine, but functionally the two constructions are substantially equivalent.

Referring once again to FIGURES 1–10 and FIGURES 11 and 12, when the mandrel is pulled up while the barrel is stationary, the cams 215, 227 or 225, 213, whichever are first contacted by the points 217, 229 of the tongues 211, 223, will turn the mandrel to bring the tongues 211, 223 into alignment with the slots 221, 209 respectively, following which further axial upward travel of the mandrel will move the tongues into the slots in which they are adapted to fit fairly close. In this position, rotation of the mandrel will turn the barrel too, whereby the barrel can be oriented azimuthally.

The tongues and slots thus form clutch means to engage the barrel and mandrel when desired. The clutch means has a single relative azimuthal position of engagement and thus also functions as an azimuthal alignment means. The cams provide means to guide the mandrel and barrel into alignment. It is to be noted that the tongues and slots permit a certain amount of relative axial motion of the barrel and mandrel without the clutch disengaging. To limit such axial motion to prevent clutch disengagement except when desired, latch means is provided. Limitation of relative axial movement of barrel and mandrel also enables the barrel positively to be positioned axially in the well bore by means of manipulation of the mandrel.

The latch means includes a hydraulic detent means and a hydraulic lock means. The detent means includes vertical slot 231 in barrel section 57 engageable by pin 233. Slot 231 need not extend clear through the barrel, it being necessary only that there be an aperture to receive the pin 233. Pin 233 is axially slidably disposed in a bushing 235 fixed in radial port 237 in the side of mandrel 41. An O-ring 239 seals the pin 233 to bushing 235. A flange 241 engages shoulder 243 preventing outward travel of the bushing. The bushing may further be held in place by epoxy cement. A head 245 on the pin 233 limits outward travel of the pin by engagement with flange 241. The outer end of pin 233 is bevelled, as best shown in FIGURE 12.

When pin 233 is extended outwardly to its limit, as shown, it enters slot 231 in barrel section 57, thereby limiting relative axial travel of the barrel and mandrel 41, the range of travel being less than that needed to disengage the tongues and slots of the clutch means.

The reason for the slot 231 having a vertical extent greater than the diameter of pin 233 is to allow them to be in register over a short range of relative axial positions of barrel and mandrel, for with some drilling rigs the brakes allow the mandrel to drop a little after the cable drum has been unclutched from its drive motor, and it is not desired that the pin 233 support the weight of the drill string.

Pin 233 tends to move outwardly to its maximum extent whenever there is pressure in the fluid passage 91 in the mandrel. However, the pin can be driven inwardly by mechanical force overcoming the fluid pressure; that is what happens when the barrel section 57 passes over pin 233 during engagement of the clutch means. Pin 233 and slot 231 thus form a hydraulic detent means. The bevelled end of pin 233 and the part of mandrel 231 adjacent slot 231 provide means to move the detent means from the engaged position with the pin in the slot limiting relative axial motion of barrel and mandrel to a disengaged position permitting such motion.

It is to be noted that the anchor barrel will resist an axial thrust of the order of 10,000 pounds, with drilling fluid pressure differential of the order of 500 p.s.i. acting on the anchor shoes, whereas with the same drilling fluid pressure, the barrel can override the hydraulic detent with an axial thrust of about 500 pounds.

To hold the hydraulic detent means extended when the pressure in the mandrel 41 is lowered, hydraulic lock means is provided. The lock means includes a blade 247 reciprocable in fluid passage 91. The blade has a rib 249 along one edge which slides in a groove 251 (see also FIGURE 17) in a button 253. Button 253 is generally cylindrical and is releasably disposed in a socket 255 in mandrel 41, e.g. it may be lightly held in place by a little epoxy cement. It can then be replaced easily if need be.

The surface of the opposite edge of the block is formed as a step having a stop portion 257 extending all the way to the wall of flow passage 91 and a recess portion 259 of less radial extent. When stop portion 257 is engaged with the head 245 on the detent pin 233, the latter is locked in its fully extended position. Spring means, to be described, tends to hold the blade in this locking position. When the fluid pressure in the mandrel is increased, hydraulic means, to be described moves the blade downwardly bringing recess portion 259 opposite head 245 of pin 233. In this position of the blade, the hydraulic detent formed by pin 233 and slot 231 is unlocked allowing the pin to move in and out depending on the predominance of the outward hydraulic pressure on the pin or of mechanical force pushing the pin inward when the barrel section 57 rides over the pin during engagement or disengagement of the clutch means.

The step blade 247 of the locking means is connected to a stabilizer blade 261 carrying pads 263, 265 (see FIGURE 17) which engage the mandrel wall to provide lateral stability to the step blade, keeping the plane of the step blade in alignment with the axis of pin 233.

Stabilizer blade 261 is pivotally connected to the upper end of tubular piston stem 267 by pivotal connecting means including a pintle 269 passing through the blade 261 and the two arms of yoke 271 formed at the upper end of stem 267. This pivotal connection minimizes the possibility of mechanical forces on the pin pushing inward on the cam blade being transmitted to the stem 267.

Piston stem 267 carries a piston body 273 sealed thereto by O-ring 275 and held axially thereon by snap rings 277, 279 engaged in correlative grooves in the tubular piston stem. The piston body 273 carries a double lip seal sleeve 281 bonded thereto.

The piston, including body 273 and seal sleeve 281, reciprocates in a liner 283 inside flow passage 91 in the mandrel. The liner 283 has an external shoulder 285 which bears against shoulder 287 in the flow passage 91 to limit its upward travel. The pin 289 of a conventional drill bit or a float sub (downwardly opening check valve) screwed into the lower end of mandrel 41 retains the liner in the mandrel. Holes 291 in the liner are engageable with a pulling tool when it is desired to remove and replace the liner. An O-ring 293 seals the liner to flow passage 91.

An inturned flange 295 on liner 283 provides a seal for the lower end of helical spring 297 concentrically disposed in the annulus 299 between liner 283 and piston stem 267. The upper end of spring 297 bears against washer 301 which in turn bears against snap ring 279 under the piston. The spring 297 thus forms resilient means urging the cam blade 247 of the lock means upwardly into position locking the detent means in extended position. The piston 273-281 provides hydraulic means to move the locking means downwardly to release the detent means.

To limit the upward travel of the piston, the lower end of piston stem 267 is provided with an outturned flange 303 that engages beneath flange 295. To permit exit of fluid in annulus 299 when the piston moves down, the fit between piston stem 267 and liner 283 at flanges 295 and 303 is loose. To insure sufficient pressure differential to actuate the hydraulic lock, an orifice 307 may be placed in the lower end of piston stem 267, being held in place between shoulder 309 and snap ring 311 and sealed to the stem 267 by an O-ring 313.

It is believed that the method of operation of the tool will be clear from the introductory description coupled with the foregoing detailed description of the individual parts and their functions. However, to recapitulate, the sequence of operations would normally be as follows:

(1) With the back stop rings 167 and 169 in selected estimated desired positions and with a float (check valve) and drill bit connected to the bottom of the drill bit control apparatus and valve closure 115 in place, and the mandrel latched to the barrel, the apparatus is lowered into the earth bore. A stabilizer is connected to the upper end of the apparatus, and one or more drill collars are connected above the stabilizer. Then lengths of drill pipe are successively connected above the last drill collar, thus making up the drill string and lowering the apparatus to the bottom of the earth bore.

(2) The pumps are turned on forcing drilling fluid down the drill string and out the drill bit to flush detritus back up the annulus between earth bore and drill string. At this time the drill string can be rotated and reciprocated up and down to help stir up the detritus and facilitate flushing it out of the bore. Since the valve closure is in place, the barrel annulus is not subject to internal pressure and the anchor shoes are retracted making it possible to move the apparatus up and down freely.

(3) The pump is turned off and a string of wire line tools are shown in FIGURES 20 and 21, including an alignment collar, survey instrument, and valve closure removal tool, are lowered into the drill string and through the valve closure passage 115 to the bottom of the apparatus where they are aligned by the pin 155 on pencil 153 mounted on the hydraulic lock means.

(4) The surveying instrument is allowed to remain still long enough to record the azimuthal direction of inclination of the hole relative to the mandrel and the extent thereof.

(5) The surveying instrument is withdrawn and the balls of the valve closure removal tool engage beneath the valve closure 103 and remove it.

(6) The drill string is lowered to place the drill bit within about two feet from the bottom of the bore and the string is turned to place the barrel (latched to the mandrel) in the desired azimuthal position so that the center line of the bank of anchor shoes is at the high side of the hole and the previously selected one of the back stop bosses is at the low side of the hole. If more than mere reduction of hole inclination is desired, the barrel is set to position the desired back stop lug at the side of the bore toward the direction which it is desired to bore the hole.

(7) The pump is turned on, thereby releasing the hydraulic lock and extending the anchor shoes of the barrel. The drill string is lowered and the pin 233 of the hydraulic detent disengages from the mandrel slot 231. The drill string is lowered far enough for the tongue 239 on the mandrel to be below tongue 217 on the barrel so that relative rotation is possible. At this point the bit will be close to bottom.

(8) Drilling is commenced. The barrel guides the drill bit in the desired direction. If hydraulic pushover means are incorporated in the apparatus, hydraulic pressure forces the bit against the end of the earth bore. Drilling proceeds to the limit established by engagement of the shoulder 51 at the upper end of the mandrel with the detritus seal at the upper end of the mandrel.

(9) The string is elevated to engage the hydraulic detent.

10) The pumps are turned off locking the hydraulic detent in extended position and releasing the anchor shoes.

(11) The survey instrument and alignment collar are lowered into the apparatus onto pencil 153.

(12) Time is allowed for the survey instrument to make a recording.

(13) The survey instrument is withdrawn. (Steps 11-13 may be omitted if change in direction or extent of inclination is not expected to be sufficient to warrant a survey.)

(14) The string is lowered and turned if need be to reposition the barrel at a lower level in the bore about two feet off bottom and at the desired azimuthal position.

(15) The pump is turned on to extend the anchor shoes and release the hydraulic lock.

(16) The drill string is lowered two feet (overriding the hydraulic detent and disengaging the hydraulic clutch).

(17) Drilling is resumed.

(18) Foregoing steps 8-17 repeated. If at any time the survey shows that the extent of lateral displacement of the barrel is different from that which is desired, the apparatus can be withdrawn from the bore and the back stop rings reset to a different position permitting greater or lesser displacement.

Whenever it is necessary to flush the bore again, steps 1-7 may be performed, with or without the surveying slips included.

All the threaded connections have right hand threads except those between barrel sections 55 and 56 and between barrel sections 56 and 57 and between mandrel 41 and collar 219. If an attempt is made to drill with the barrel anchored and the clutch engaged, there will be no tendency to unscrew the left hand connections.

While a preferred embodiment of the invention has been shown and described, variations thereof can be made by one skilled in the art without departing from the spirit of the invention.

That being claimed is:

1. An apparatus including
a tubular mandrel,
a barrel rotatably and axially slidably mounted on the mandrel for motion over a range of axial travel,
seal means carried by the barrel defining a pressurable annulus between the barrel and mandrel,
port means in the mandrel to place the interior of the mandrel in communication with said annulus throughout said range of axial relative motion of the mandrel and barrel,
anchor means mounted in the barrel extendable by pressure in said annulus,
detent means to connect the mandrel to the barrel to limit relative axial travel thereof to less than said range,
stop means to lock the detent means in engaged position connecting the mandrel and barrel,
spring means urging the stop means into locking position, and
means responsive to fluid pressure in the mandrel to move the stop means out of locking position,
whereby the stop means is moved out of locking position concurrently with the extension of the anchor means and,
means for moving said detent means out of said engaged position when said stop means is out of said locking position.

2. An apparatus including
a barrel rotatably and axially slidably mounted on the mandrel,
seal means carried by the barrel defining a pressurable annulus between the barrel and mandrel,
port means in the mandrel to place the interior of the mandrel in communication with said annulus throughout said range of axial relative motion of the mandrel and barrel,
anchor means mounted in the barrel extendable by pressure in said annulus,
detent means to connect the mandrel to the barrel,
stop means to lock the detent means in position connecting the mandrel and barrel,
spring means urging the stop means into locking position, and
means responsive to fluid pressure in the mandrel to move the stop means out of locking position,
whereby the stop means is moved out of locking position concurrently with the extension of the anchor means,
said detent means including
an aperture in the barrel, a pin reciprocable in the mandrel, means sealing between the pin and the mandrel, one end of the pin providing means exposed to fluid pressure in the mandrel tending to extend the pin outwardly from the mandrel into said aperture in the barrel to connect the barrel to the mandrel, the other end of the pin being adapted to be pressed inwardly when the barrel overrides same to disengage the pin from the aperture.

3. Combination according to claim 2 wherein said anchor means are asymetrically disposed around the barrel whereby on extension thereof in an earth bore the barrel is displaced laterally in a predetermined direction, and said apparatus further includes cooperating cam means on the barrel and mandrel to move the barrel and mandrel into a single predetermined azimuthal position relative to each other upon relative axial motion of the barrel and mandrel into position bringing the cam means into engagement.

4. Combination according to claim 3 including a back stop ring mounted on said barrel for rotation to any desired azimuthal position relative to the barrel and securement in such position, said ring including a plurality of bosses of varying radial extent azimuthally spaced around said ring, whereby a desired one of said bosses can be positioned in the line of lateral displacement of said barrel by said anchor means so as to limit such displacement.

5. Combination according to claim 3 including tongue and slot means on the barrel and mandrel engageable when said barrel and mandrel are in said single predetermined azimuthal position to maintain alignment of said barrel and mandrel in said azimuthal position while said mandrel and barrel are moved axially relative to each other over the range of engagement of said tongue and slot means.

6. Combination according to claim 5 wherein said barrel aperture forming part of the detent means has an extent in the direction of the axis of the mandrel greater than the extent of the detent in that direction whereby there is allowed a range of relative axial motion of the mandrel and barrel while said pin is still in register with said aperture, the range of axial motion possible while said tongue and slot means are in engagement including the range of axial motion in which said pin is in register with said aperture.

7. Combination according to claim 6 wherein said pin is disposed at a level of said mandrel no higher than the uppermost part of the tongue means on the mandrel.

8. Combination according to claim 3 wherein said stop means for locking the detent means carries azimuthal alignment means adapted to cooperate with azimuthal alignment means connected to a surveying instrument to position the surveying instrument in a single predetermined azimuthal position relative to the mandrel.

9. Combination according to claim 8 including a bushing in said mandrel having port means extending through one side thereof, an orifice plug screwed into the port means in the mandrel and extending into the port means in the bushing to maintain said port means in register, means sealing the bushing to the mandrel, said bushing being finished on its inner surface to provide annular valve seat means above and below said port means, said bushing having an upwardly facing internal shoulder to support a valve closure sleeve thereon, and a tubular valve closure sleeve adapted to cooperate with said bushing to close said port means, said sleeve being adapted to pass a surveying instrument.

10. Combination according to claim 9 including an assembly of wire line apparatus, said assembly including a surveying instrument means for measuring direction and extent of inclination of the mandrel relative to the alignment means on the stop means, an alignment collar connected below the surveying instrument means and adapted to cooperate with said alignment means on the stop means, and a valve closure removal tool connected above the surveying instrument, said tool including ball means movable in races from retracted positions to extended positions, said ball means when retracted allowing the tool to pass through said valve closure sleeve with said surveying instrument and alignment collar, said ball means when extended being engageable with the lower end of said valve closure sleeve to enable said sleeve to be removed with said assembly from said apparatus to open said port means.

11. Combination according to claim 3 including means connected to the upper end of the mandrel providing a downwardly facing shoulder, said barrel including a spacer sleeve at the upper end thereof, the upper end of the spacer sleeve being engageable with said shoulder, said shoulder and upper end of the sleeve providing means limiting the upward travel of said barrel relative to said mandrel, said cam means providing means to limit the downward travel of said barrel relative to said mandrel.

12. Combination of claim 11 wherein said means connected to the upper end of the mandrel includes the tubular body of a stabilizer.

13. An apparatus Including
a tubular mandrel,
a barrel rotatably and axially slidably mounted on the mandrel for motion over a range of axial travel,
seal means carried by the barrel defining a pressurable annulus between the barrel and mandrel,
port means in the mandrel to place the interior of the mandrel in communication with said annulus throughout said range of axial relative motion of the mandrel and barrel,
anchor means mounted in the barrel extendable by pressure in said annulus,
detent means to connect the mandrel to the barrel to limit relative axial travel thereof to less than said range,
said detent means including an aperture in the barrel, a radial port in said mandrel, and a pin reciprocably mounted in said port for in and out motion transverse to the axis of the barrel into and out of said aperture, and
means for locking said pin in position extending into said aperture.

14. An aparatus including
a tubular mandrel,
a barrel rotatably and axially slidably mounted on the mandrel for motion over a range of axial travel,
seal means carried by the barrel defining a pressurable annulus between the barrel and mandrel,
port means in the mandrel to place the interior of the mandrel in communication with said annulus throughout said range of axial relative motion of the mandrel and barrel,
anchor means mounted in the barrel extendable by pressure in said annulus,
detent means to connect the mandrel to the barrel to limit relative axial travel thereof to less than said range,
said detent means including an aperture in the barrel, a port in said mandrel, and a pin reciprocably mounted in said port for motion into and out of said aperture, and
means sealing between said port and said pin, one part of said pin providing means exposed to fluid pressure in the mandrel tending to move the pin into said aperture and another part of said pin providing means exposed to fluid pressure outside the mandrel tending to move the pin out of said aperture.

15. Combination according to claim 14 further including locking means to hold the pin in position where it extends into said aperture regardless of the predominance of the forces thereon due to fluid pressures inside and outside the mandrel.

16. Combination according to claim 15 wherein said locking means includes
spring means urging the locking means to position holding the pin in the aperture and
means responsive to a predetermined fluid pressure in the mandrel to move the locking means to position permitting the pin to move out of the aperture, and
means for moving said pin out of said aperture when said locking means is in the last said position.

References Cited

UNITED STATES PATENTS

| | | | |
|---|---|---|---|
| 2,179,567 | 11/1939 | Strength | 175—73 |
| 2,696,367 | 12/1954 | Robishaw | 175—295 |
| 2,745,635 | 5/1956 | Zublin | 175—76 |
| 2,891,769 | 6/1959 | Page et al. | 175—76 |
| 3,023,821 | 3/1962 | Etherington | 175—230 |
| 3,126,971 | 3/1964 | Kellner et al. | 175—230 |

CHARLES E. O'CONNELL, *Primary Examiner.*

JAMES A. LEPPINK, *Examiner.*